(12) United States Patent
Wang et al.

(10) Patent No.: US 8,266,714 B2
(45) Date of Patent: Sep. 11, 2012

(54) ACCESS CONTROL IN A MULTI-PRINCIPAL BROWSER

(75) Inventors: Jiahe Helen Wang, Redmond, WA (US); Alexander Moshchuk, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 12/550,263

(22) Filed: Aug. 28, 2009

(65) Prior Publication Data

US 2011/0055892 A1    Mar. 3, 2011

(51) Int. Cl.
*H04L 29/06* (2006.01)
(52) U.S. Cl. ............ 726/29; 726/22; 713/164; 709/229
(58) Field of Classification Search .............. 726/2–4, 726/22, 29; 713/164; 709/229
See application file for complete search history.

(56) References Cited

U.S. PATENT DOCUMENTS

| 7,155,490 | B1 | 12/2006 | Malmer et al. |
| 2005/0177753 | A1* | 8/2005 | Carpenter .............. 713/201 |
| 2007/0011179 | A1 | 1/2007 | Paval |
| 2007/0136579 | A1* | 6/2007 | Levy et al. .............. 713/168 |
| 2008/0313648 | A1 | 12/2008 | Wang et al. |
| 2009/0007152 | A1 | 1/2009 | Cahill et al. |
| 2009/0077124 | A1 | 3/2009 | Spivack et al. |
| 2009/0106456 | A1 | 4/2009 | Muller et al. |

FOREIGN PATENT DOCUMENTS
WO   WO2008111049 A2   9/2008

OTHER PUBLICATIONS

"Adobe Flash Player Multiple Vulnerabilities", retrieved on Jun. 23, 2009 at <<http://secunia.com/advisories/26027/>>, Secunia Advisories, Secunia, pp. 1-2.
Ajwani, et al., "Characterizing the Performance of Flash Memory Storage Devices and its Impact on Algorithm Design", retrieved on Jun. 23, 2009 at <<http://domino.mpi-inf.mpg.de/internet/reports.nsf/c125634c000710cd80255ef200387b6e/97ad4f8726d86917c12573db004b6348/$FILE/MPI-I-2008-1-001.pdf>>, Jan. 2008, 3 title pages and pp. 1-33.
Anderson, "Computer Security Technology Planning Study", retrieved on Jun. 23, 2009 at <<http://csrc.nist.gov/publications/history/ande72.pdf>>, Oct. 1972, 142 pgs.
Banga, et al., "Resource Containers: A New Facility for Resource Management in Server Systems", retrieved on Jun. 23, 2009 at <<http://www.usenix.org/events/osdi99/full_papers/banga/banga.pdf>>, Proceedings of the 3rd Symposium on Operating Systems Design and Implementation, Feb. 1999, 15 pgs.
Barth, et al., "The Security Architecture of the Chromium Browser", retrieved on Jun. 23, 2009 at <<http://crypto.stanford.edu/websec/chromium/chromium-security-architecture.pdf>>, WWW2009, Apr. 2009, pp. 1-10.

(Continued)

*Primary Examiner* — Jung Kim
*Assistant Examiner* — Ayoub Alata
(74) *Attorney, Agent, or Firm* — Lee & Haynes, PLLC

(57) ABSTRACT

A principal operating system based-browser controls access to resources. The resources are represented semantically in a resource object model. A browser kernel of the browser mediates resources access calls from principals. In some implementations the principals are web entities and the resources are peripheral devices. The resource object model separates device semantics from physical device access. Resource access control policies are maintained by the browser kernel and separated from device access mechanisms.

20 Claims, 8 Drawing Sheets

OTHER PUBLICATIONS

"Capability-Based Computer Systems", retrieved on Jun. 23, 2009 at <<http://www.cs.washington.edu/homes/levy/capabook/Chapter1.pdf>>, pp. 1-18.

"CFS Group Scheduling", retrieved on Jun. 22, 2009 at <<http://lwn.net/Articles/240474/>>, 3 pgs.

Chase, et al., "Sharing and Protection in a Single Address Space Operating System", retrieved on Jun. 23, 2009 at <<http://citeseerx.ist.psu.edu/viewdoc/download;jsessionid=42A05FEE8FC92B18023309645C58BF9E?doi=10.1.1.52.4172&rep=rep1&type=pdf>>, Technical Report 93-04-02, Department of Computer Science and Engineering, University of Washington, Apr. 1993, revised Jan. 1994, 3 title pages and pp. 1-33.

Chopra, "Browser-based Operating Systems", retrieved on Jun. 23, 2009 at <<http://pcquest.ciol.com/content/search/showarticle.asp?artid=94062>>, PCQuest, 2009, pp. 1-2.

Clark, et al., "An Architectural Overview of the Alpha Real-Time Distributed Kernel", retrieved on Jun. 23, 2009 at <<http://citeseerx.ist.psu.edu/viewdoc/download?doi=10.1.1.26.4422&rep=rep1&type=pdf>>, 21 pgs.

Czajkowski, et al., "JRes: A Resource Accounting Interface for Java", retrieved on Jun. 23, 2009 at <<http://citeseerx.ist.psu.edu/viewdoc/download?doi=10.1.1.57.2551&rep=rep1&type=pdf>>, Proceedings of the 1998 ACM OOPSLA Conference, Oct. 1998, 15 pgs.

"Document Object Model (DOM)", retrieved on Jun. 23, 2009 at <<http://www.w3.org/dom/>>, W3C DOM IG, Jan. 19, 2005, pp. 1-3.

Douceur, et al., "Leveraging Legacy Code to Deploy Desktop Applications on the Web", retrieved on Jun. 23, 2009 at <<http://www.usenix.org/event/osdi08/tech/full_papers/douceur/douceur_html/index.html>>, Microsoft Research, pp. 1-21.

Eriksen, "Trickle: A Userland Bandwidth Shaper for Unix-like Systems", retrieved on Jun. 23, 2009 at <<http://www.monkey.org/~marius/trickle/trickle.pdf>>, 10 pgs.

Ford, et al., "Evolving Mach 3.0 to a Migrating Thread Model", retrieved on Jun. 23, 2009 at <<http://citeseerx.ist.psu.edu/viewdoc/download;jsessionid=51453CF2C070F6AD810C547DB4588DB9?doi=10.1.1.19.7348&rep=rep1&type=pdf>>, University of Utah, pp. 1-18.

"Gears Improving Your Web Browser", retrieved on Jun. 23, 2009 at <<http://gears.google.com/>>, Google, 2008, 1 pg.

"Geolocation API Specification", retrieved on Jun. 23, 2009 at <<http://dev.w3.org/geo/api/spec-source.html>>, W3, Jun. 8, 2009, pp. 1-6.

Google Gears, retrieved on Jun. 22, 2009 at <<http://gears.google.com/>>, 1 pg.

"Google Projects for Android", retrieved on Jun. 23, 2009 at <<http://code.google.com/android/>>, Google, pp. 1-3.

Goyal, et al., "A Hierarchical CPU Scheduler for Multimedia Operating Systems", retrieved on Jun. 23, 2009 at <<http://www.cs.virginia.edu/~zaher/classes/CS656/osdi96.pdf>>, Distributed Multimedia Computing Laboratory, Department of Computer Sciences, University of Texas, 15 pgs.

Grier, et al., "Secure Web Browsing With the OP Web Browser", retrieved on Jun. 23, 2009 at <<http://www.cs.uiuc.edu/homes/kingst/Research_files/grier08.pdf>>, 15 pgs.

Grimshaw, et al., "Wide-Area Computing: Resource Sharing on a Large Scale", retrieved on Jun. 23, 2009 at <<http://www.cs.virginia.edu/papers/widearea.pdf>>, Computing Practices, IEEE, May 1999, pp. 29-37.

Hamilton, et al., "The Spring Nucleus: A Microkernel for Objects", retrieved on Jun. 23, 2009 at <<http://research.sun.com/techrep/1993/smli_tr-93-14.pdf>>, Sun Microsystems, Apr. 1993, pp. 1-15.

Harty, et al., "Application-Controlled Physical Memory using External Page-Cache Management", retrieved on Jun. 23, 2009 at <<http://www.cs.ucsb.edu/~ravenben/papers/coreos/HC92.pdf>>, Computer Science Department, Stanford University, 11 pgs.

Howell, et al., "MashupOS: Operating System Abstractions for Client Mashups", retrieved on Jun. 23, 2009 at <<http://www.usenix.org/event/hotos07/tech/full_papers/howell/howell_html/>>, pp. 1-11.

"HTML 5", retrieved on Jun. 23, 2009 at <<http://www.w3.org/html/wg/html5/>>, W3C, Jun. 17, 2009, pp. 1-191.

Hunt, et al., "Singularity: Rethinking the Software Stack", retrieved on Jun. 23, 2009 at <<http://research.microsoft.com/apps/pubs/?id=69431>>, Microsoft Research, Apr. 1, 2007, 1 pg.

Jim, et al., "Defeating Script Injection Attacks with Browser-Enforced Embedded Policies", retrieved on Jun. 23, 2009 at <<http://www2007.org/papers/paper595.pdf>>, WWW 2007, Track: Security, Privacy, Reliability, and Ethics, Session: Defending Against Emerging Threats, 2007, pp. 601-610.

Krueger, et al., "Tools for the Development of Application-Specific Virtual Memory Management", retrieved on Jun. 23, 2009 at <<http://citeseerx.ist.psu.edu/viewdoc/summary?doi=10.1.1.52.9000>>, Computer Science Division, University of California, Berkeley, 17 pgs.

McNamee, et al., "Extending the Mach External Pager Interface to Accommodate User-Level Page Replacement Policies", retrieved on Jun. 23, 2009 at <<http://citeseerx.ist.psu.edu/viewdoc/download?doi=10.1.1.54.1025&rep=rep1&type=pdf>>, Department of Computer Science and Engineering, University of Washington, pp. 1-9.

MemberWiki, "Mobile Device APIs Style Guide", retrieved on Jun. 23, 2009 at <<http://www.openajax.org/member/wiki/Mobile_Device_APIs_Style_Guide>>, Oct. 9, 2008, pp. 1-11.

Moshchuk, et al., "Flashproxy: Transparently Enabling Rich Web Content via Remote Execution", retrieved on Jun. 23, 2009 at <<http://www.cs.washington.edu/homes/gribble/papers/sys169-moshchuk.pdf, MobiSys 2008, ACM, 13 pgs.

"NetLimiter—Ultimate Bandwidth Shaper", retrieved on Jun. 23, 2009 at <<http://www.netlimiter.com/>>, Locktime Software, 2003-2008, 1 pg.

Petrou, et al., "Implementing Lottery Scheduling: Matching the Specializations in Traditional Schedulers", retrieved on Jun. 23, 2009 at <<http://www.usenix.org/events/usenix99/full_papers/petrou/petrou.pdf>>, Proceedings of the 1999 USENIX Annual Technical Conference, USENIX, 1999, 15 pgs.

Regehr, "Using Hierarchical Scheduling to Support Soft Real-Time Applications in General-Purpose Operating Systems", retrieved on Jun. 23, 2009 at <<http://citeseer.ist.psu.edu/cache/papers/cs/21991/http:zSzzSzwww.cs.utah.eduzSz~regehrzSzpaperszSzdisszSzregehr-diss-single.pdf/regehr01using.pdf>>, May 2001, pp. i-xii and 1-169.

Reis, et al., "Isolating Web Programs in Modern Browser Architectures", retrieved on Jun. 23, 2009 at <<http://www.cs.washington.edu/homes/gribble/papers/eurosys-2009.pdf>>, EuroSys 2009, ACM, 2009, 13 pgs.

Rizzo, "Dummynet: a simple approach to the evaluation of network protocols", retrieved on Jun. 23, 2009 at <<http://citeseerx.ist.psu.edu/viewdoc/download?doi=10.1.1.57.2969&rep=rep1&type=pdf>>, ACM Computer Communicaton Review, vol. 27, No. 1, Jan. 1997, pp. 31-41.

Saltzer, et al., "The Protection of Information in Computer Systems", retrieved on Jun. 23, 2009 at <<http://www.acsac.org/secshelf/papers/protection_information.pdf>>, 30 pgs.

"Same Origin Policy for JavaScript", retrieved on Jun. 23, 2009 at <<http://www.mozilla.org/projects/security/components/same-origin.html>>, Mozilla Developer Center, pp. 1-3.

Sharma, "What is the Real speed of your 3G connection", retrieved on Jun. 23, 2009 at <<http://www.xtremelabs.com/blog, Xtreme Labs, Dec. 4, 2008, pp. 1-5.

Tanenbaum, et al., "Using Sparse Capabilities in a Distributed Operating System", retrieved on Jun. 23, 2009 at <<http://citeseerx.ist.psu.edu/viewdoc/download?doi=10.1.1.49.7998&rep=rep1&type=pdf, pp. 64-74.

"The Multi-Principal OS Construction of the Gazelle Web Browser" Wang et al, Microsoft Research, <<http://research.microsoft.com/apps/pubs/default.aspx?id=79655 available as early as Feb. 19, 2009, 1 pg.

"V8 JavaScript Engine", retrieved on Jun. 23, 2009 at <<http://code.google.com/p/v8/>>, Google Code, Google, 2009, pp. 1-2.

Vandat, et al., "WebOS: Operating System Services for Wide Area Applications", retrieved on Jun. 23, 2009 at <<http://ieeexplore.ieee.org/stamp/stamp.jsp?tp=&arnumber=709956&isnumber=15339>>, 12 pgs.

Waldspurger, et al., "Lottery Scheduling: Flexible Proportional-Share Resource Management", retrieved on Jun. 23, 2009 at <<http:// www.usenix.org/publications/library/proceedings/osdi/full_papers/ waldspurger.pdf>>, MIT Laboratory for Computer Science, 11 pgs.
Wallach, et al., "Extensible Security Architectures for Java", 16th Symposium on Operating Systems Principles, Oct. 1997, Saint-Malo, France, retrieved on Jun. 23, 2009 at <<http://www.csl.sri. com/users/ddean/papers/sosp97.pdf, pp. 1-26.
Wang, et al., "Protection and Communication Abstractions for Web Browsers in MashupOS", SOSP'07, Oct. 14-17, 2007, Stevenson, WA, retrieved on Jun. 23, 2009 at <<http://research.microsoft.com/ en-us/um/people/helenw/papers/sosp07mashupos.pdf>>, 15 pgs.
Wang, et al., "The Multi-Principal OS Construction of the Gazelle Web Browser", retrieved on Jun. 23, 2009 at <<http://research. microsoft.com/pubs/79655/gazelle.pdf>>, MSR Technical Report MSR-TR-2009-16, pp. 1-20.
"What's New in Internet Explorer 8", retrieved on Jun. 23, 2009 at <<http://msdn.microsoft.com/en-us/library/cc288472.aspx>>, Microsoft Corporation, 2009, pp. 1-10.
Wilburn, et al., "The Light Field Video Camera", retrieved on Jun. 23, 2009 at <<http://graphics.stanford.edu/papers/lfvc/wilburn-lfcamera-spie02.pdf>>, Computer Systems Lab, Electrical Engineering Department, Stanford University, 8 pgs.
Wobber, et al., "Authorizing Applications in Singularity", ACM, EuroSys'07, Mar. 21-23, 2007, Lisboa, Portugal, retrieved on Jun. 23, 2009 at <<http://research.microsoft.com/pubs/59976/ eurosys2007_security.pdf>>, 14 pgs.
".Net Framework Developer Center", retrieved on May 24, 2010 at <<http://msdn.microsoft.com/en-us/netframework/default.aspx>>, Microsoft Corporation, 2010, pp. 1.
"Adobe Flash Player 9 Security Whitepaper", retrieved on May 24, 2010 at <<http://www.adobe.com/devnet/flashplayer/articles/ flash_player_9_security.pdf>>, Adobe Systems Incorporated, Jul. 2008, pp. 1-50.
Barth, et al., "Protecting Browsers from Frame Hijacking Attacks", retrieved on May 24, 2010 at <<http://crypto.stanford.edu/ websec/ frames/navigation/>>, Stanford Web Security Research, 2007, pp. 1-5.
Barth, et al., "Securing Frame Communication in Browsers", retrieved May 24, 2010 at <<http://seclab.stanford.edu/websec/ frames/post-message.pdf>>, Communications of the ACM, vol. 52, No. 6, Jun. 2009, pp. 83-91.
"Changes in AllowScriptAccess default (Flash Player)", retrieved on May 24, 2010 at <<http://www. adobe.com/go/kb403183, Adobe Systems Incorporated, 2010, pp. 1-8.
Chen, et al., "An Analysis of Browser Domain-Isolation Bugs and a Light-Weight Transparent Defense Mechanism", retrieved on May 24, 2010 at <<http://research.microsoft.com/en-us/um/people/ shuochen/papers/scriptaccenting.pdf>>, ACM, Proceedings of Conference on Computer and Communications Security (CCS), Alexandria, VA, 2007, pp. 2-11.
"Components.utils.evalInSandbox", retrieved Jun. 4, 2010, from:https://developer.mozilla.org/En/Components.utils.evalInSandbox, 4 pages.
Crockford, "JSONRequest", retrieved on May 24, 2010 at <<http:// www.json.org/jsonrequest.html>>, Apr. 17, 2006, pp. 1-8.
Crockford, "The <module> Tag, A Proposed Solution to the Mashup Security Problem", retrieved on May 24, 2010 at <<http://www.json. org/module.html>>, Oct. 30, 2006, pp. 1-3.
Crockford, "The module Tag, A Proposed Solution to the Mashup Security Problem", retrieved on May 24, 2010 at <<http://www.json. org/module.html>>, Oct. 30, 2006, pp. 1-3.
"Cross-domain Vulnerability in Microsoft Internet Explorer 6", retrieved on May 24, 2010 at <<http://cyberinsecure.com/cross-domain-vulnerability-in-microsoft-internet-explorer-6/>>, Cyberinsecure.com, Jun. 27, 2008, pp. 1-9.
D. Kristol and L. Montulli. "HTTP State Management Mechanism". RFC 2965, Oct. 2000, 25 pages.
Dhamija, et al., "The Battle Against Phishing: Dynamic Security Skins", retrieved on May 24, 2010 at <<http://citeseerx.ist.psu.edu/ viewdoc/download?doi=10.1.1.60.9398&rep=rep1&type=pdf>>, Symposium on Usable Privacy and Security (SOUPS), Pittsburgh, PA, Jul. 2005, pp. 1-12.

"Document Object Model (DOM) Level 2 Core Specification", retrieved on May 24, 2010 at <<http://www.w3.org/TR/DOM-Level-2-Core/>>, W3C Recommendation, Nov. 13, 2000, pp. 1-3.
Dutta, "Client Side Cross-Domain Security Whitepaper", retrieved on May 24, 2010 at <<http://code.msdn.microsoft.com/ xdsecuritywp/Release/ProjectReleases.aspx?ReleaseId=1157>>, Microsoft Corporation, Jun. 2008, pp. 1-24.
"Firefox 3 for developers—MDC", retrieved on May 24, 2010 at <<https://developer.mozilla.org/en/Firefox_3_for_developers>>, mozilla.org, Sep. 1, 2009, pp. 1-9.
Flanagan, D., JavaScript: The Definitive Guide. O'Reilly Media Inc., Aug. 2006.
Goldberg, et al., "A Secure Environment for Untrusted Helper Applications, Confining the Wily Hacker", retrieved on May 24, 2010 at <<http://www.cypherpunks.ca/~iang/pubs/janus-usenix96.pdf>>, USENIX Association, Proceedings of Conference on Security Symposium, Focusing on Applications of Cryptography, vol. 6, 1996, pp. 1-13.
GreenBorder—Wikipedia, retrieved Jun. 4, 2010 from: <<http://en. wikipedia.org/wiki/GreenBorder>>, 1 page.
Grier, et al., "building a more secure Web browser", retrieved on May 24, 2010 at <<http://www.usenix.org/publications/login/2008-08/ pdfs/grier.pdf>>, Login: The USENIX Magazine, vol. 33, No. 4, Aug. 2008, pp. 14-21.
Grossman, "Advanced Web Attack Techniques using GMail", retrieved on May 24, 2010 at <<http: //jeremiahgrossman.blogspot. com/2006/01/advanced-web-attack-techniques-using.html>>, Jan. 27, 2006, pp. 1-7.
"How Mozilla determines MIME Types", Aug. 2006, retrieved from: http://developer.mozilla.org/en/docs/How_Mozilla_determines_ MIME_Types., 4 pages.
"HTML 4.01 Specification", retrieved on May 24, 2010 at <<http:// www.w3.org/TR/REC-html40/>>, W3C Recommendation, Dec. 24, 1999, pp. 1-12.
HTML5 (including next generation additions still in development), Draft Standard, Jun. 2, 2010, Retrieved from: http://www.whatwg. org/specs/web-apps/current-work/, 384 pages.
Hunt, et al., "Detours: Binary Interception of Win32 Functions", retrieved on May 24, 2010 at <<http://research.microsoft.com/pubs/ 68568/huntusenixnt99.pdf>>, USENIX Association, Proceedings of Windows NT Symposium, Seattle, WA, Jul. 1999, pp. 1-9.
"IE content-type logic", retrieved on May 24, 2010 at <<http://blogs. msdn.com/ie/archive/2005/02/01/364581.aspx>>, Microsoft Corporation, IEBlog, 2010, pp. 1-16.
"IEBlog—IE8 Security Part V—Comprehensive Protection", retrieved on May 24, 2010 at <<http://blogs.msdn.com/ie/archive/ 2008/07/02/ie8-security-part-v-comprehensive-protection.aspx>>, Microsoft Corporation, IEBlog, 2010, pp. 1-41.
"Introducing JSON", retrieved on May 24, 2010 at <<http://www. json.org/>>, JSON, 2010, pp. 1-6.
Ioannidis, et al., "Building a Secure Web Browser", retrieved on May 24, 2010 at <<http://citeseerx.ist.psu.edu/viewdoc/download? doi=10.1.1.120.2439&rep=rep1&type=ps>>, USENIX Association, Proceedings of FREENIX Track: 2001 Technical Conference, 2001, pp. 127-134.
Jackson, et al., "Protecting Browser State from Web Privacy Attacks", retrieved on May 24, 2010 at <<http://citeseerx.ist.psu.edu/ viewdoc/download?doi=10.1.1.75.4136&rep=rep1&type=pdf>>, ACM, Proceedings of International Conference on World Wide Web (WWW), Edinburgh, UK, May 2006, pp. 737-744.
Jackson, et al., "Protecting Browsers from DNS Rebinding Attacks", retrieved on May 24, 2010 at <<http://crypto.stanford.edu/dns/dns-rebinding.pdf>>, ACM, Proceedings of Conference on Computer and Communications Security (CCS), Alexandria, VA, 2007, pp. 421-431.
Meketa, "Security changes in Flash Player 7", retrieved on May 24, 2010 at <<http://www.adobe.com/devnet/flash/articles/fplayer_security.html>>, Adobe Systems Incorporated., Flash Player Developer Center, 2010, pp. 1.
"Microsoft Internet Explorer Remote Window Hijacking Vulnerability", retrieved on May 24, 2010 at <<http://www.securityfocus.com/ bid/11855>>, SecurityFocus, Dec. 8, 2004, pp. 1-18.

"Microsoft Security Intelligence Report (SIR)", retrieved on May 24, 2010 at <<http://www.microsoft.com/security/portal/sir.aspx>>, Microsoft Corporation, Malware Protection Center, vol. 8, 2009, pp. 1-3.

"Microsoft working on a new secure Web Browser—Gazelle", retrieved on May 24, 2010 at <<http://www.computersafetytip.com/microsoft-working-on-a-new-secure-web-browser-%E2%80%93-gazelle.html>>, Computersafetytip.com, Mar. 10, 2009, pp. 1-3.

"Microsoft's 'Gazelle' Browser more secure than all others", retrieved on May 24, 2010 at <<http://forum.thewindowsclub.com/microsoft-technologies-discussions/27090-microsofts-gazelle-browser-more-secure-than-all-others.html>>, The Windows Club, Feb. 24, 2009, pp. 1-4.

Miller, et al., "Paradigm Regained: Abstraction Mechanisms for Access Control", retrieved on May 24, 2010 at <<http://www.springerlink.com/index/L52PWK0K3G02E37B.pdf, Springer-Verlag Berlin, Lecture Notes in Computer Science vol. 2896, Advances in Computer Science—ASIAN 2003, 2003, pp. 224-242.

"MIME Type Detection in Internet Explorer", retrieved on May 24, 2010 at <<http://msdn.microsoft.com/en-us/library/ms775147.aspx>>, Microsoft Corporation, 2010, pp. 1-4.

Morrisett, et al., "From System F to Typed Assembly Language", retrieved on May 24, 2010 at <<http://citeseerx.ist.psu.edu/viewdoc/download?doi=10.1.1.24.6526&rep=rep1&type=pdf>>, ACM Transactions on Programming Languages and Systems (TOPLAS), vol. 21, No. 3, 1999, pp. 527-568.

"Mozilla Browser and Mozilla Firefox Remote Window Hijacking Vulnerability", retrieved on May 24, 2010 at <<http://www.securityfocus.com/bid/11854/>>, SecurityFocus, Dec. 8, 2004, pp. 1-10.

Necula, et al., "Safe Kernel Extensions Without Run-Time Checking", retrieved on May 24, 2010 at <<http://www.cs.arizona.edu/~collberg/Teaching/620/1999/Handouts/imurdock1.pdf>>, ACM SIGOPS Operating Systems Review, vol. 30, No. SI, 1996, pp. 229-243.

Process Models (The Chromium Projects), "The Chromium Projects", 2008, retrieved on Jun. 4, 2010 from http://dev.chromium.org/developers/design-documents/process-modelshttp://dev.chromium.org/developers/design-documents/process-models, 5 pgs.

Reis, et al., "Browser Security: Lessons from Google Chrome", retrieved on May 24, 2010 at <<http://www.adambarth.com/papers/2009/reis-barth-pizano.pdf>>, Communications of the ACM, vol. 52, No. 8, 2009, pp. 45-49.

Reis, et al., "Using Processes to Improve the Reliability of Browser-based Applications", retrieved on May 24, 2010 at <<http://citeseerx.ist.psu.edu/viewdoc/download;jsessionid= EFE2131C078725 25 A24DD03BDBBAB2F 2?doi=10.1.1.136.2646&rep=rep1&type=pdf>>, University of Washingto, Technical Report UW-CSE-2007-12-01, 2007, pp. 1-13.

Ruderman, J. "Same origin policy for JavaScript", retrieved Jun. 4, 2010, from:https://developer.mozilla.org/En/Same_origin_policy_for_JavaScript, 2 pages.

"Security Advisories for Firefox 2.0", retrieved on May 24, 2010 at <<http://www.mozilla.org/security/known-vulnerabilities/firefox20.html>>, Mozilla.org, 2010, pp. 1-6.

"Security Center—Bulletins Advisories Tools Guidance Resources", 2010, retrieved Jun. 4, 2010 from: http://technet.microsoft.com/en-us/security/default(printer).aspx, 2 pages.

Shankar, et al., "Doppelganger: Better Browser Privacy Without the Bother", retrieved on May 24, 2010 at <<http://citeseerx.ist.psu.edu/viewdoc/download?doi=10.1.1.68.4489&rep=rep1&type=pdf>>, ACM, Proceedings of Conference on Computer and Communications Security (CCS), Alexandria, VA, 2006, pp. 154-167.

Turner, D., Symantec internet security threat report: Trends for Jan.-Jun. 2007, Technical Report Symantec Inc., 2007, vol. XII, 134 pages.

van Kesteren (ed.), "XMLHttpRequest", retrieved on May 24, 2010 at <<http://www.w3.org/TR/XMLHttpRequest/>>, W3C Working Draft, Nov. 29, 2009, pp. 1-17.

van Kesteren (ed.), "XMLHttpRequest Level 2", retrieved on May 24, 2010 at <<http://dev.w3.org/2006/webapi/XMLHttpRequest-2/>>, W3C, 2009, pp. 1-23.

W3C. Authorizing Read Access to XML Content Using the <?accesscontrol?> Processing Instruction 1.0. http://www.w3.org/TR/access-control/, May 2006, 1 page.

Wagner, et al., "A Security Analysis of the Combex DarpaBrowser Architecure", retrieved on May 24, 2010 at <<http://www.combex.com/papers/darpa-review/security-review.html>>, Darpa Review, Mar. 2, 2002, pp. 1-26.

Wang et al., "Protection and Communication Abstractions in MashupOS". In ACM Symposium on Operating System Principles, Oct. 2007, 15 pages.

Yu, et al., "JavaScript Instrumentation for Browser Security", retrieved on May 24, 2010 at <<http://www.docomolabsresearchers-usa.com/~dyu/js-tr.pdf, ACM, Proceedings of Symposium on Principles of Programming Languages (POPL), Jan. 2007, Nice, FR, pp. 237-249.

* cited by examiner

ACCESS CONTROL IN A MULTI-PRINCIPAL BROWSER

RELATED APPLICATION

This disclosure describes, in part, access control, while a co-pending patent application describes, in part, resource sharing. The co-pending patent application describing resource sharing is entitled, "Resource Sharing in Multi-Principal Browser", application Ser. No. 12/550,293, that is filed concurrently on Aug. 28, 2009, and is incorporated by reference for all that it teaches.

TECHNICAL FIELD

The subject matter relates generally to resource management, particularly management of resources accessed with a principal operating system based-browser.

BACKGROUND

Web browsers have evolved from discrete applications to integral portions of an operating system (OS) and even to independent platforms with characteristics of an OS. Conventional operating systems interact with many different users each with different privileges such as guests or administrators. Operating systems frequently fulfill the role of enforcing security policies, managing competing resource demands, and allocating access to computing resources. The evolution of web browsers has lead to web browsers being called on to function as an OS. Web browsers functioning as OSes will need to fulfill similar roles as conventional OSes.

In the web context the principals (analogous to users) with which browser-based OSes interact are web sites. Allocation of resources, security policy, and similar considerations are analyzed based on the web site accessed by the browser. Web browsers that do not function as a principal operating system based-browser may handle each principal piecemeal without a standardized resource sharing, security, or similar policies. For example, a trusted intranet web site may have privileges analogous to that of a user with administrator privileges whereas an unverified web site may be given only limited privileges similar to a guest user. One of the privileges which may be managed is access to computing resources such as memory, network bandwidth, or peripheral devices.

Currently resource management is handled by conventional operating systems in a number of different ways. Unix-based OSes use file system-based access control. Individual physical devices are mapped to files and the permissions are set accordingly. Drivers, as well as higher-level software that directly accesses devices, directly manipulate access control defaults for each physical device. WINDOWS®-based OSes use access tokens to describe the privileges of a user account, and use security descriptors to describe the access control list for a securable object. A securable object may be a named WINDOWS® object, such as files and physical devices, or an unnamed object, such as process or thread objects. These ways of handling resource management may be deficient if, for example, resource management of the operating system is bypassed by a web site directly accessing resources via the browser application.

Resource management in existing web browsers is largely non-existent. Web browsers do not manage computing resources such as CPU, memory, and network connectivity, and web browsers allow a plug-in to bypass any security measures implemented by the web browser and directly access the underlying OS. This design has problems such as leading to multiple and potentially conflicting security policies as well as limiting the ability of browsers to present the types of rich and robust content available to applications running directly on a conventional, commodity OS. Therefore, web browser applications, including web browsers that may function as OSes, lack useful resource management capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes techniques for managing resources with a principal operating system-based browser. In particular, managing resources includes controlling access to resources. The resources may include peripheral devices such as cameras, GPS devices, telecom network interface devices, microphones, speakers, dialers, and the like. This disclosure describes a multi-principal browser with a browser kernel that determines whether a system call from a principal (e.g., web application) requesting access to a resource (e.g., peripheral device) is permitted. When the system call is permitted, the system call may be implemented by a system call implementation module within a browser kernel. The system call from the multi-principal browser is communicated to a commodity OS via the browser kernel. The commodity OS provides the browser kernel access to the resource based on the system call and this access is then passed in turn from the browser kernel to the principal.

Resources, such as peripheral devices, that exist within a computer system are modeled in a resource object model tree. The resource object model tree represents resource capabilities as nodes. The nodes in the resource object model include leaf nodes, intermediate nodes, and a root node. When a principal is authorized to access a node the principal is also authorized to access the resources of all respective sub-nodes. This resource object model represents the capabilities of resources on an abstract level allowing the resource management conducted in a browser kernel to occur independent of the details of specific resources accessed by the commodity OS.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Multi-Principal Browser-Based Operating System

A multi-principal browser-based operating system (OS) is a multi-principal OS that supports web applications as the first-class principals. Unlike traditional OSes such as WINDOWS® which treat users as principals, a multi-principal browser treats web applications or web sites as OS principals, The principal is labeled with the triple of <protocol; domain; port>, just as in the same-origin policy in conventional browsers. Upgrading the browser to the status of an OS allows web applications to have features and rich functionality. Additionally, the security and stability benefits of an OS are realized in the web browser.

Figure 1:
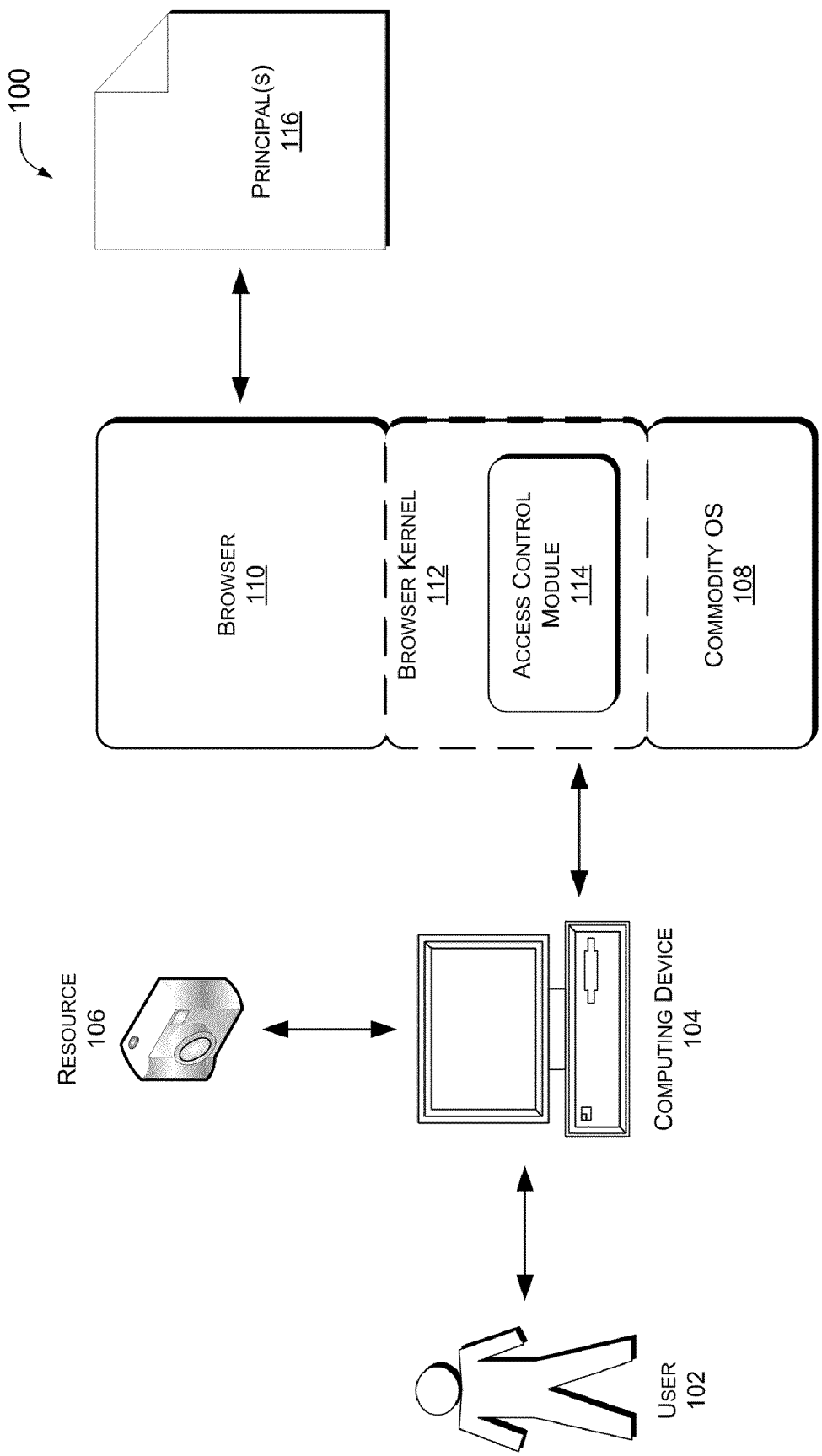
FIG. 1 is a schematic of a system for controlling access to resources in a principal operating system-based browser.

FIG. 1 shows a system 100 including a user 102 interacting with a computing device 104 that is coupled to at least one resource 106. The resources may include a camera, a global positioning system device, a telecom network interface device, a speaker, a dialer, or the like. The computing device 104 includes a "standard" or "conventional" OS identified here as a commodity OS 108. In some implementations, this commodity OS 108 may be a commercially available product such as one of the WINDOWS® family of operating systems. The commodity OS 108 underlies, or runs beneath a multi-principal browser 110.

In the illustrated example, the multi-principal browser 110 may include a browser kernel 112. The browser kernel 112 may include an access control module 114 to implement resource management, specifically control of access to resources 106. The access control module 114 provides access control services to determine access control for a resource by determining which principal(s) 116 may access the resource.

Accordingly, the system 100 recognized two types of principals. The commodity OS 108 recognizes the user 102 as a principal and the multi-principal browser 110 recognizes a web entity as a principal 114. The web entity may be a web page, a web site, a web-hosted application a web service, a process of a web service, etc. In this disclosure, "principal" refers to web applications or similar web entity and not to users.

Figure 2:
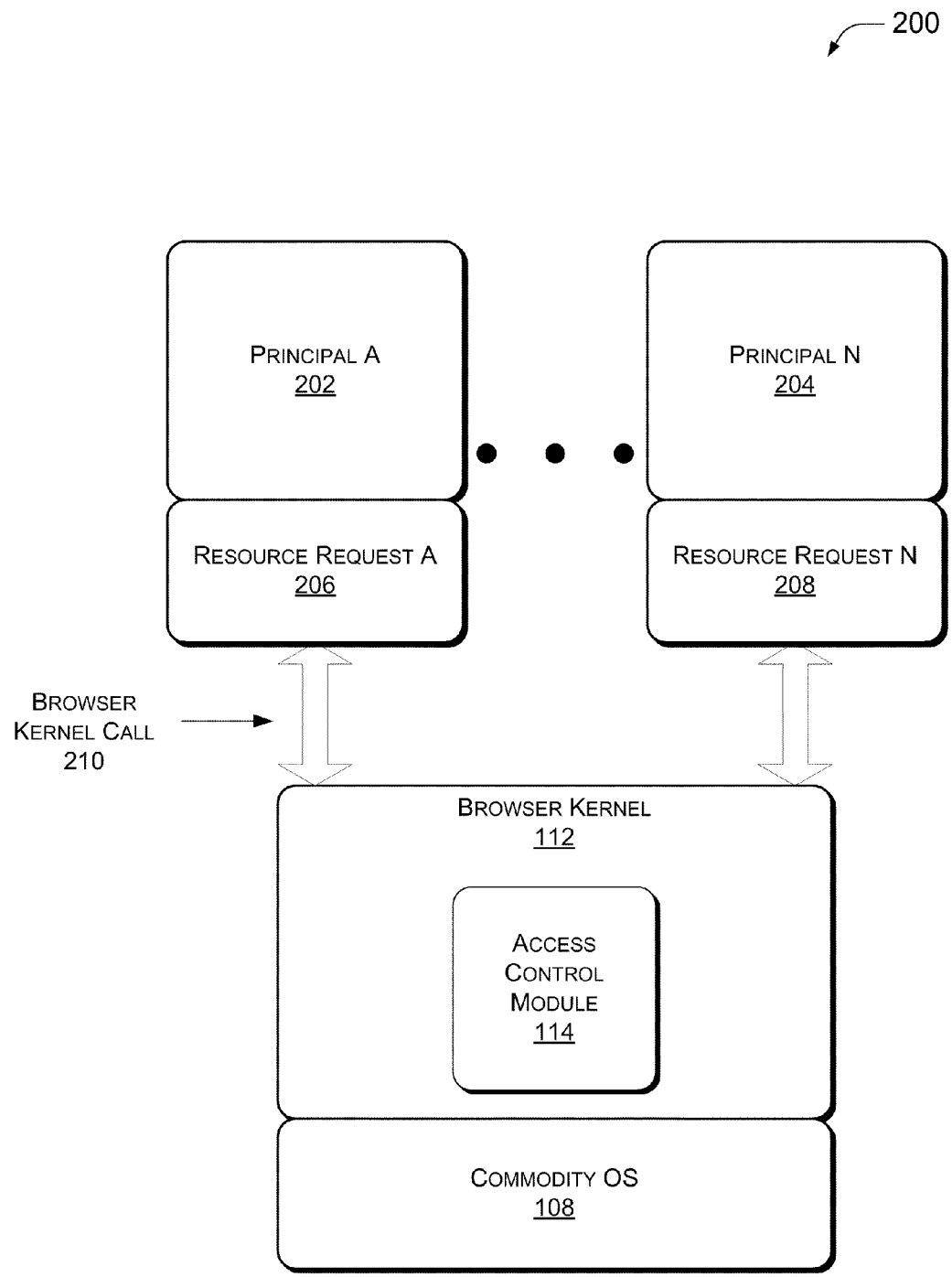
FIG. 2 is an architecture showing principals accessing a commodity operating system in conjunction with the principal operating system-based browser.

FIG. 2 shows an architecture 200 of principals communicating with the browser kernel 112. Any number of principals 116 may interact with the browser kernel 112 simultaneously or in series. Multiple principals are illustrated in FIG. 2 as principal A 202 to principal N 204. In some implementations, the principals are a type of web entity, such as web sites, described above. Each principal 202, 204 may request access to one or more resources. The resource requests are shown here as resource request A 206 and resource request N 208. Even though each principal is shown with only one resource request it is understood that a single principal may request multiple resources. Additionally, in some implementations a single resource may be requested, and accessed, by multiple principals 202, 204.

Each resource request 206, 208 is communicated to a computing device 104 executing the multi-principal browser 110. For example, a web browser is directed to a web site available on the Internet or other network and the web site attempts to access the speakers of the computing device 104 to play a sound. The browser kernel 112 in conjunction with the commodity OS 108 form a total OS that implements the request to access the speakers. The commodity OS 108 may be customized in such a way that web-application-specific resource management policies may be enabled by using the browser kernel 112. In one implementation, the CPU scheduling of the commodity OS 108 is customized. The commodity OS 108, is now operating as a customized commodity OS. Other types of customization are also possible.

The multi-principal browser 110 includes a browser kernel 112. The browser kernel 112 runs in a separate protection domain and interposes between the browser principals 202, 204 and the commodity OS 108. The browser kernel 112 mediates the principals' 202, 204 access to system resources 106 by functioning as an operating system in conjunction with the customized commodity OS 108. The browser kernel 112 handles browser kernel calls 210 from the principals 202, 204. The browser kernel 112 utilizes the customized commodity OS 108 to access system resources 106. The logic for processing web entity (e.g., a runtime library, plug-ins) resides in the principal space with one of the principals 202, 204, and resource management function is primarily managed by the browser kernel 112 with guidance from the access control module 114. The access control module 114 provides access control services to determine access control for the resource 106 by determining which principals 202, 204 may access the resource 106.

Figure 3:
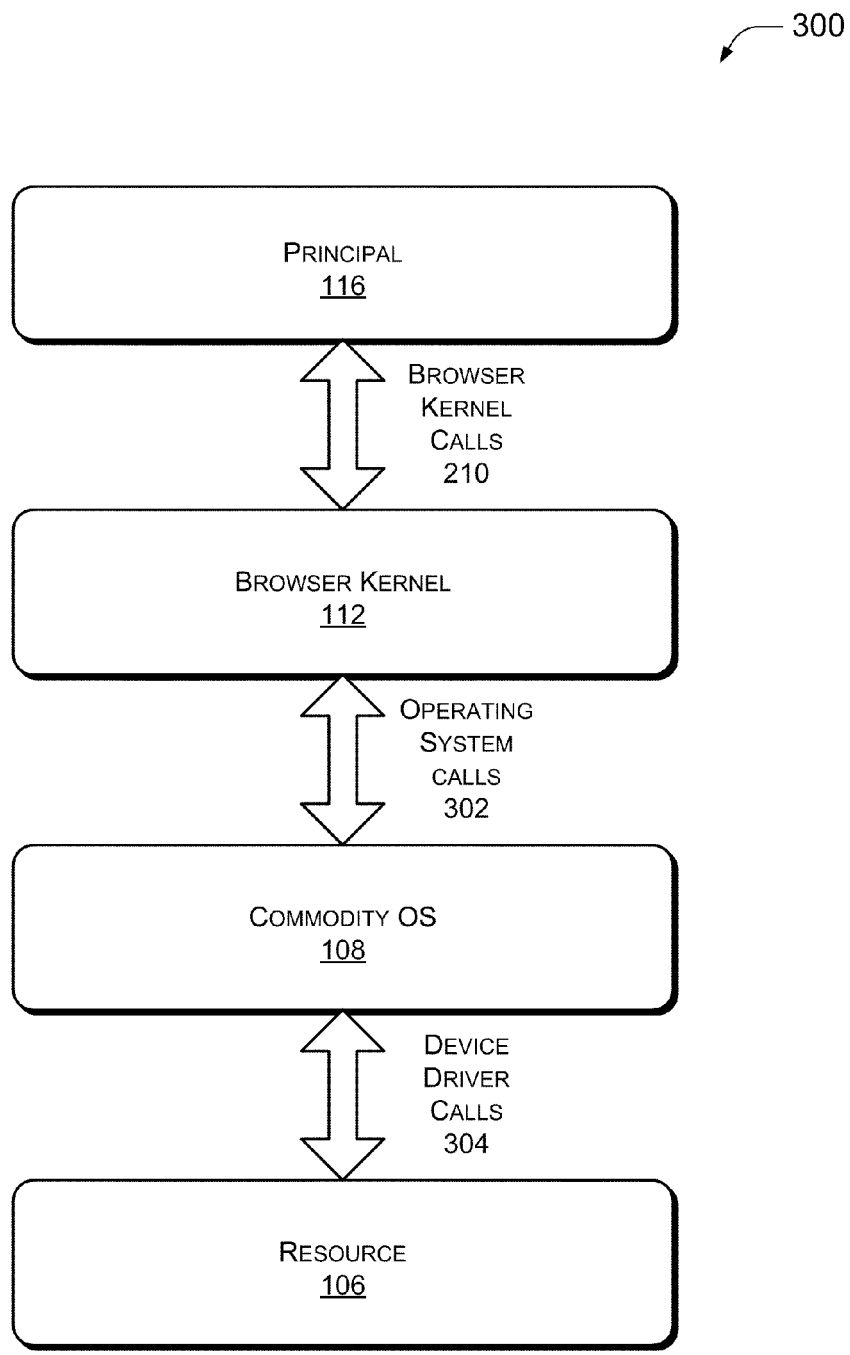
FIG. 3 is flowchart showing a series of calls from a principal to a resource.

FIG. 3 shows a flow diagram 300 representing a series of calls from a principal 116 to a resource 106. The principal 116 places browser kernel calls 210 to the browser kernel 112. The principal 116 may be similar or the same as any one of the principals 202, 204 shown in FIG. 2. The browser kernel 112 in turn sends operating system calls 302 to the commodity OS 108. By passing calls through the browser kernel 112 the processes of the principal 116 are restricted so that those processes cannot interact directly with the commodity OS 108. The browser kernel 112 runs as a separate process in the commodity OS 108, and in combination with the access control module 114 manages access control for the principals 116. The commodity OS 108 places device driver calls 304 to resource 106. The resource 106 may, for example, be the digital camera shown in FIG. 1. In that case the device driver calls 304 would be specific to the model of digital camera and the associated software driver. Principals 116 use browser kernel calls 210 to access the resource 106. Because browser plug-ins run in the same spaces as the principal 116, browser plug-ins are also restricted to using the same browser kernel calls 210.

Responses or any type of data travelling back from the resource 106 to the principal 116 may travel over the same path as the calls. Specifically, a response from the resource 106 is received by the commodity OS 108 and interpreted according to the device driver calls 304. The commodity OS 108 sends operating system calls 302 to the browser kernel 112. The operating system calls 302 are translated in turn by the browser kernel 112 into browser kernel calls 210 that ultimately provide the response and/or data to the principal 116. For example, if the response is a digital photo, the data representing that image is received by the principal 116 where the principal 116 (e.g., a web application for photo editing) may modify the digital photo by adjusting the color.

Systematic Access Control

All principals 116, such as web entities, should go through the browser kernel 112 to access any resources 106. This design enables implementation of a centrally-enforced access control policy. Systematic access control is possible by separating access control policies (i.e., who gets what) from resources access mechanisms (i.e., the driver and device driver calls used to communicate with a digital camera).

Resources may be grouped into three broad categories: basic computing resources, user input devices, and peripheral resources, as shown in Table 1 below. Access control on basic computing resources, such as central processing unit (CPU), memory, display, network bandwidth, and storage, is a matter of principal admittance to a computing device 102. The browser kernel 112 may possibly adopt a white-list or black-list-based filter (e.g., for anti-phishing purposes), admitting some and denying some principals from being admitted to the computing device 102. Once a principal is admitted, it may access all of the basic computing resources. Access to basic computing resources is a binary condition, yes or no, based in some implementations on a white- or black-list.

TABLE 1

Resource characterization for access control

| Resource Types | Resource Examples | Access Control Mechanism |
|---|---|---|
| Basic computing resource | CPU, memory, display, data network, storage | Principal admittance in browser kernel |
| User input devices | Mouse, keyboard, touch screen | Exclusive user access |
| Peripheral resources | Camera, GPS device, telecom network interface device, microphone, speaker | Discretionary access control |

The second broad category of resources, user input devices such as a mouse, a keyboard, or a touch screen, may only be used by the user and cannot be used by any principals (e.g., web entities); otherwise principals could impersonate the user. For example, it would compromise security if a malicious web entity could issue calls that appeared to the commodity OS 108 as keyboard input. Accordingly, user input devices are subject to exclusive user access. Principals cannot access user input devices.

The third broad category of resources, peripheral resources, is subject to discretionary access control. Examples of peripheral resources include those listed in Table 1. One example of a peripheral resource is the digital camera 106 shown in FIG. 1. The design and possible implementations of discretionary access control for peripheral resources are discussed below. One aspect of discretionary access control design is separation of access control policies from the implementation of resource-access system calls. As shown above in FIG. 3, the browser kernel 112 effectuates of this separation by mediating resource calls from the principal 116 to the resource 106.

Figure 4:
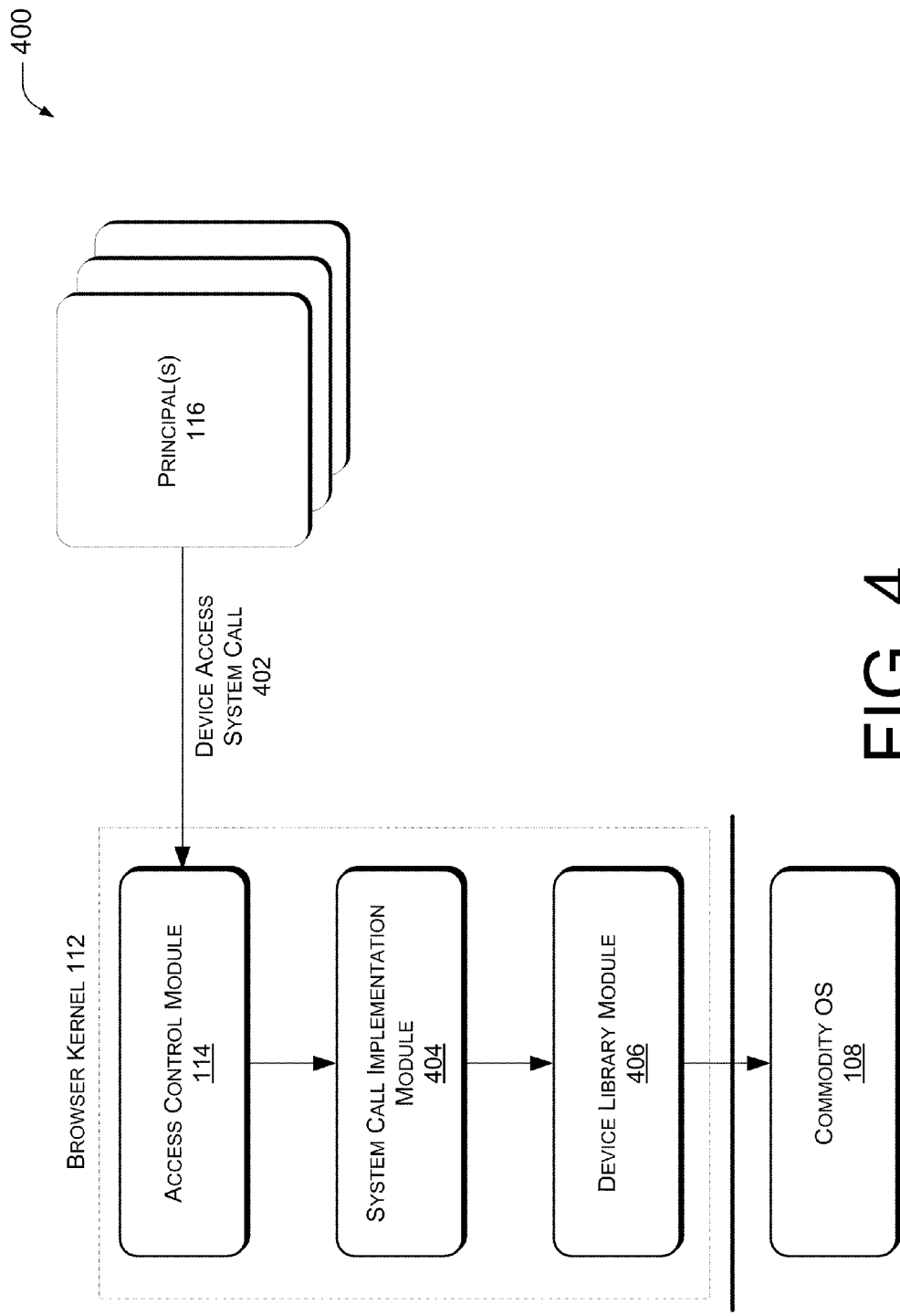
FIG. 4 is a block diagram showing a browser kernel mediating system calls from a principal.

FIG. 4 shows a block diagram of an exemplary system call 400. Shown is a browser kernel 112 mediating interaction between the principal 116 and the commodity OS 108. The principal 116 may be a process thread from a web application running within a browser 110 operating on the commodity OS 108. The browser kernel 112 receives a device access system call 402 from the principal 116. This device access system call 402 may be similar or the same as the browser kernel calls 210 shown in FIG. 2. In some implementations, the browser kernel 112 includes an access control module 114, a system call implementation module 404, and a device library module 406.

The access control module 114 is configured to decide whether a system call from a principal 116 requesting access to a resource 106 is permitted. Routing device access system calls 402 through the access control module 114 provides a single point of access control: since access control is separated into its own module, this makes access control policies and their implementations less error-prone and easier to validate. In some implementations, the access control module 114 may decide whether a system call from a principal 116 is permitted based on a resource object model that provides semantic representations of resources. One example of a resource object model is discussed below with respect to FIG. 5.

In the same or different implementations, the access control module 114 decides whether a system call from a principal 116 is permitted based on an attribute. Attributes are assigned to a capability of a resource 106. For example, a capability may include such things as a speaker (which generates sound), a dialer (which dials a number on a telecom network), and a location (which may be detected by a global positioning system (GPS) device or other device). Attributes indicate how access may be performed on a resource 106. Attributes may include "user ask", "background", "lifetime", and "concurrent use". Table 2, below, shows one possible default assignment of attributes to a number of capabilities.

TABLE 2

A default list of capabilities handed out to a web entity

| | Attributes | | | |
|---|---|---|---|---|
| Capabilities | User ask | Background | Lifetime | Concurrent use |
| Speaker | Don't ask | Allow | Forever | Yes |
| Location | Ask | Allow | Session | N/A |
| Photo Camera | Ask | Deny | Session | N/A |
| Microphone | Ask | Allow | Session | N/A |
| Dialer | Ask | Deny | One-time | N/A |

The user ask attribute instructs the browser kernel 112 to either ask or not ask the user 102 to confirm the resource access. The background attribute instructs the browser kernel 112 to deny or allow resource access when a web entity runs in background tabs of the browser 110. The lifetime attribute may take the values "one-time", "session", "forever" and informs the browser kernel 112 that the capability lifetime is one-time, the duration of the current browsing session of a particular principal instance, or forever. The concurrent use attribute is for resources 106 that allow concurrent access from multiple principals 116: when the value of the concurrent use attribute is "yes", other principals 116 are allowed to use the resource 106 concurrently; when the value of the concurrent use attribute is "no", other principals 116 are denied access to the resource 106 when this principal is using the resource 106.

The attribute list may be easily extended to support other kinds of generic restrictions, such as an ability to charge money (such as dialing toll numbers on a telecom network). It is to be understood that the attributes which are assignable to a capability may include many more attributes than those listed here and each capability may only have relevance for some of the attributes. For example, concurrent use is not applicable to the capability "dialer" because it is not possible to dial more than one number at a time.

In some implementations, the access control module 114 decides whether a device access system call 402 is permitted or not based on user input. Thus, web applications may be allowed to expand their access rights for a resource 106 with user approval. For example, a web entity that is frequently interacting with the digital camera 106 might want to avoid asking the user 102 every time it takes a picture. This could be implemented by asking the user 102 to authorize changing the user ask attribute for the digital camera 106 from "ask" to "don't ask."

In some implementations, a manifest may be used as a mechanism for centralizing all decisions involving user authorization and reducing the number of user prompts to at most one. Any web entity, or other principal 116, could provide a manifest specifying a required resource functionality; this manifest is presented to the user 102 when the web application loads. The user 102 may change the user ask and other attributes by modifying resource functionality specified in the manifest.

However, the user's ability to change access rights may be limited. In some implementations, the user 102 cannot add attributes for any capability that the web entity did not possess by default. Thus, the user 102 does not have the ability to issue arbitrary new capabilities to a web entity. The user 102 may also be prohibited from changing access permissions for a subset of resources which are protected resources. This may protect access to very sensitive resources 106 where users 102 might not be trusted with an access decision. For example, user input may not be sufficient to permit web entities operating in the background to access to a dialer that may be used to place expensive phone calls over a toll network. Other possible designs include not allowing user input to add resource access for web entities that are hosted on an untrusted or black-listed domain.

The system call implementation module 404 is configured to implement the system call when the access control module 114 decides the system call is permitted and block the system call when the access control module 114 decides the system call is prohibited. By placing the system call implementation module 404 after the access control module 114, the browser kernel 112 decides whether each system call is permitted in the access control module 114 before executing that system call. In this regard, the access control module 114 functions as a reference monitor to enforce access policies.

The device library module 406 contains an application programming interface (API) for communicating with the commodity OS 108. The OS-specific implementation lies in the device library module 406; the access control module 114 is OS-independent. Separating the implementation aspects specific to the commodity OS 108 from other portions of the browser kernel 112 provides for the advantage of extensibility. New resources 106 (e.g., peripheral devices) may be added to a computer system without modification to the access control module 114 or the system call implementation module 404. Thus, it is possible to add support for a new device to the browser kernel 112 without implementing access control or understanding the notion of web principals because only modification to the device library module 406 is necessary.

The commodity OS 108 is configured to provide the principal access to the resource 106 based on the device access system call 402. More specifically, the commodity OS 108 interacts with the resource based on the API calls received from the device library module 406. Interaction between the commodity OS 108 and a resource 106 may be similar or the same as the device driver calls 304 discussed in FIG. 3. Because the calls received from the device library module 406 appear to the commodity OS 108 as resource calls from a local application, the commodity OS 108 does not behave differently when interacting with a principal 116 that is a web entity.

Illustrative Resource Object Model

Figure 5:
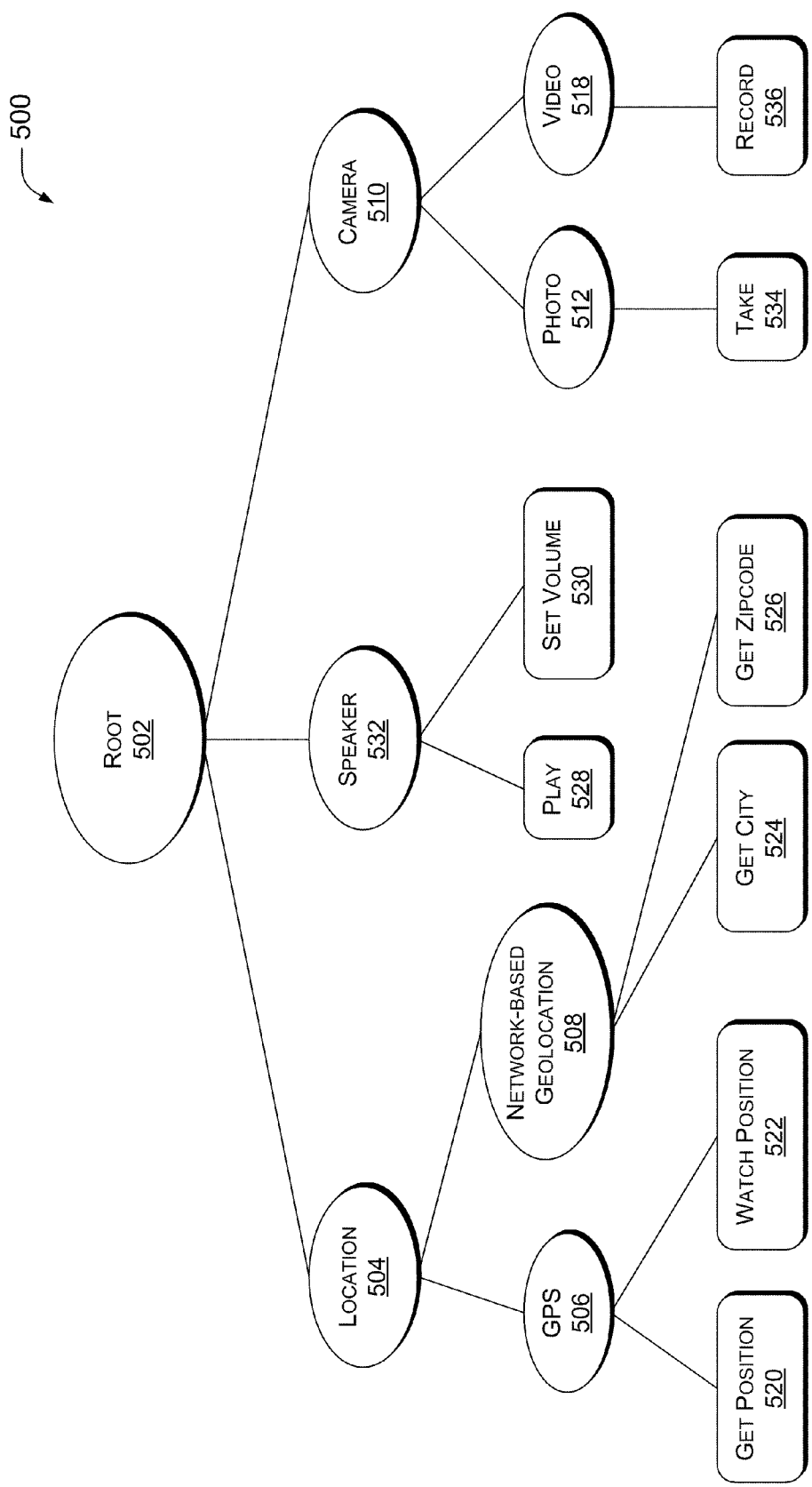
FIG. 5 is a schematic diagram showing a resource object model.

FIG. 5 shows a resource object model (ROM) 500. Modeling resource capabilities provides flexible access control granularity as well as extensibility. Resource capabilities are organized hierarchically by their semantics into a ROM tree structure. This tree structure represents a semantic model of resource capabilities. FIG. 5 gives one example of a ROM tree. A root node 502 groups all resources in the system. Related resource functions at the same tree level are grouped together into higher-level nodes in the ROM tree, forming coarse-grained resource capabilities that may be granted. For example, location 504 groups together both global position system (GPS) device 506 information and network-based geolocation 508 (e.g., inferring geographical location from an Internet protocol address or such) and camera 510 groups together photo 512 and video 518 capabilities. Leaves of the ROM 500 tree represent the most fine-grained capabilities. The leaf nodes include the get position capability 520 and the watch position capability 522 of the GPS device 506, the get city capability 524 and the get zipcode capability 526 of the network-based geolocation 508, the play capability 528 and the set volume capability 530 of the speaker 532, the take capability 534 of the photo 512 and the record 536 capability of the video 518. It is to be understood that any number of devices and capabilities beyond those explicitly shown in this illustrative ROM 500 may be included.

Each node of the ROM tree 500 may be granted to a web application or other principal as a capability; the granting of a node includes all the capabilities represented by leaf nodes in the subtree rooted by that node. For example, a principal 116 (e.g., a web application) may be granted the camera node 510 and thus has permission to take photos 534 and to record videos 536. Alternatively, if a more fine-grained allocation of resources is desired the principal may only be granted the photo node 512 including the ability to take still pictures 534 but lack permission to use the video node 518 to record video 536.

The separation of resource semantics (e.g., the node representation) from physical resources (e.g., the actual device) eases extensibility when adding a new physical resource that follows existing resource semantics. For example, upgrading the GPS device 500 to a newer model with a new driver will not affect the ROM tree 500 and access control to the GPS device 500 because the semantics are abstract representations which are not linked to a particular device, driver, or API.

Capabilities possessed by the devices may be implemented as [node ID, unforgeable-token, attributes] triples. The node ID maps to a node on the ROM tree. The unforgeable-token may be tied to a password-capability model and thus include a token that is used by the browser kernel 112 to prevent web entities from forging capabilities. The capability may have a list of multiple attributes including, but not limited to, the attributes shown above in Table 2.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations will be omitted.

The processes are illustrated as a collection of blocks in logical flowcharts, which represent a sequence of operations that can be implemented in hardware, software, or a combination of hardware and software. For discussion purposes, the processes are described with reference to the system shown in FIG. 1. However, the processes may be performed using different architectures and devices.

Figure 6:
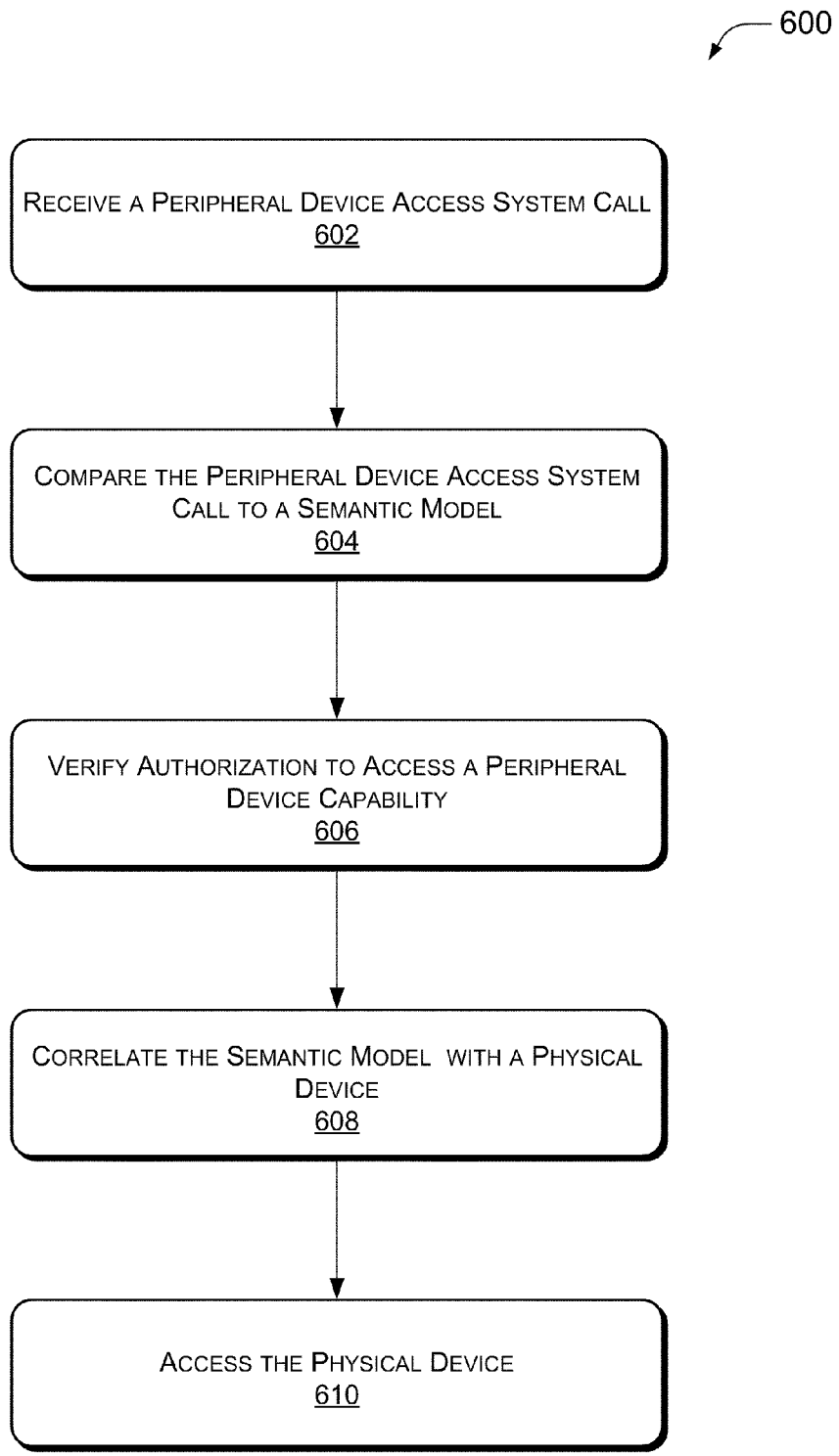
FIG. 6 is a flowchart showing an exemplary method of accessing a device.

FIG. 6 illustrates a flowchart of a process providing a web application access to a peripheral device while separating device semantics from physical device access 600. In block 602, a computing device 104 receives a peripheral device access system call from a web service process. As discussed above, the peripheral device may be any type of device 106 such as a camera, a global positioning system device, a telecom network, a microphone, a speaker, a dialer etc. In some implementations, the system call is the same as the browser kernel call 210 shown above in FIG. 2. The peripheral device access system call may, in some implementations, be a JavaScript call.

In block 604, the peripheral device access system call is compared to a semantic model of peripheral device capabilities. In some implementations, the comparison may be performed by a processor of the computing device 104. The semantic model of peripheral device capabilities may be a hierarchal resource object model tree similar to that shown in FIG. 5. In other implementations, an alternative semantic model may be used. This comparing identifies whether or not a peripheral device with the requested capability is available and, if such device is available, identifies the semantic representation of the peripheral device.

In block 606, the browser kernel 110 running in the browser OS verifies that the web service has authorization to access the peripheral device capability specified by the peripheral device access system call. As discussed above, filtering authorization and permission requests through the browser kernel allows for a consistent security policy and greater level of protection against malicious content.

In block 608, the semantic model of the peripheral device capabilities specified by the peripheral device access system call is correlated with a physical device 106 and, in some implementations, a device driver for the physical device 106. For example, if the access call requests access to a digital camera for the purpose of taking a photograph, the specific model of camera and the device driver for that camera are matched with the semantic model for taking a photograph. As discussed above, this use of a semantic model separates the details of physical device access from abstract representations of device functionalities used by web entities. As discussed above, the physical device 106 is not limited to a digital camera but may also include such peripheral devices as a GPS device, a telecom network interface device, a microphone, a speaker, or the like.

In block 610, the device driver operating, if a specific device driver is required, on a commodity OS 108 accesses the physical device 106 to provide the requested functionality to the web entity. In some implementations, the capabilities of the peripheral device 106 are provided to the web entity via the browser kernel 112.

The browser kernel 112 that is used to implement a part of this process may serve to mediate not only calls from a web entity but also to mediate communication between a browser plugin and the commodity OS 108. In contrast, many conventional web browsers allow browser plugins to directly access the commodity OS 108 operating system. Placing the browser kernel 112 between all resource calls, whether the call originates from a browser plugin or a web entity, provides the security and consistency discussed above.

Figure 7:
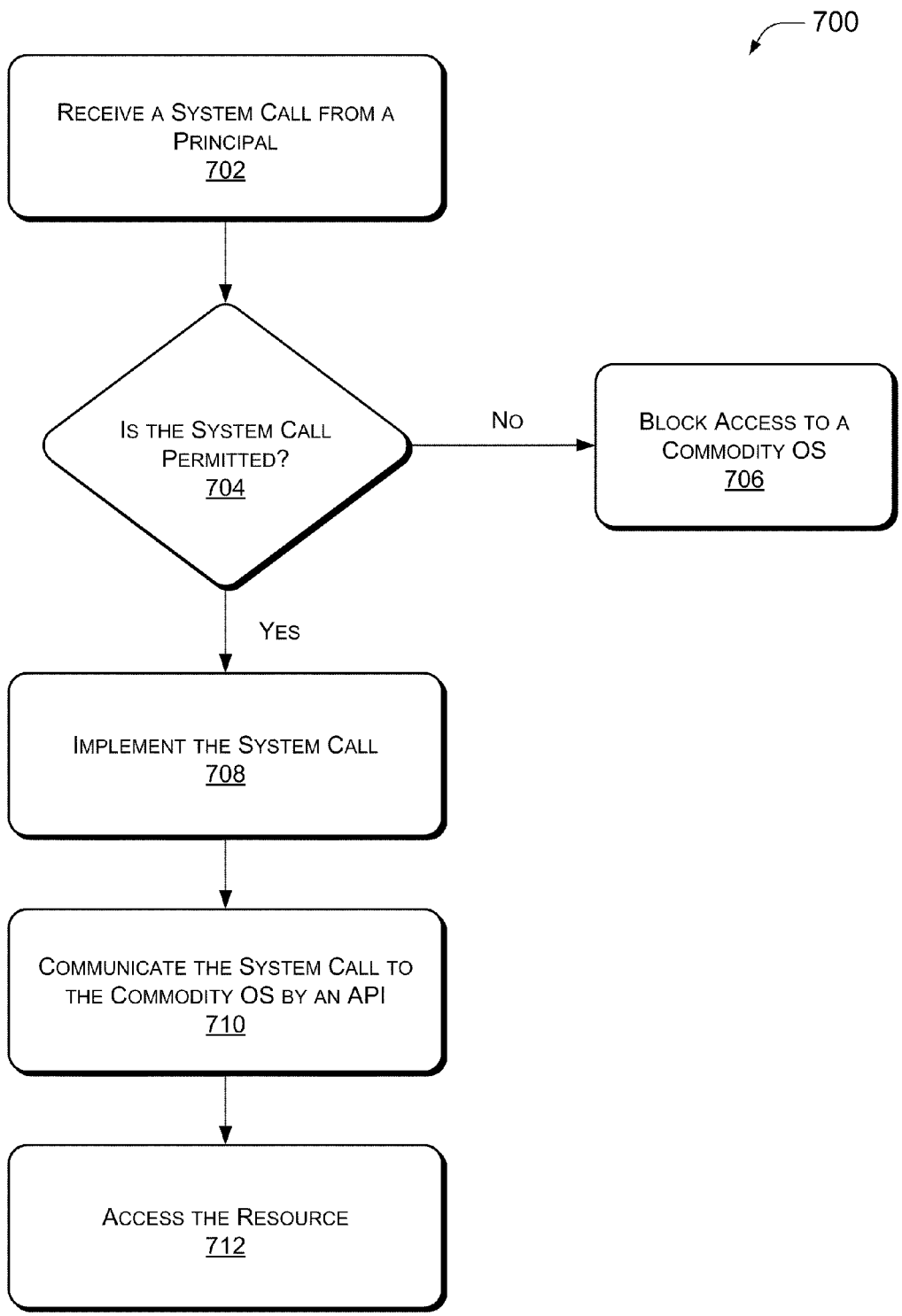
FIG. 7 is a flowchart showing an illustrative method of accessing a resource.

FIG. 7 illustrates a flowchart of a process for providing a principal 116 access to a resource 106 while separating access control policies from access mechanisms 700. In block 702, a system call is received from a principal 116. In some implementations, the principal 116 is a web entity such as discussed above. The system call is received by a browser application 110 with a browser kernel 112.

In block 704 the system call is evaluated in terms of access control policies. In some implementations, a browser kernel 112 includes an access control module 114. In the same or different implementations, the access control policies may be implemented similar to the capabilities discussed with respect to Table 2 above. When the system call is not permitted, the process 700 proceeds along the right side to the "no" branch to block 706 and blocks access to the commodity OS 108 and thus also blocks access to the resource 106.

Returning to block 704, when the system call is permitted, process 700 proceeds from block 704 along the "yes" branch to block 708 and implements the system call. In some implementations, the system call is implemented by a system call implementation module 404 such as shown in FIG. 4. At block 710, the system call is subsequently communicated to the commodity OS 108 by an application programming interface (API). The API may be the same or similar to an API used by an application (other than the browser 110) running on the commodity OS 108. Alternatively, or in conjunction with the above-mentioned APIs, the browser 110 may use customized APIs that are recognized by a customized aspect of the commodity OS 180. In some implementations, the API is contained within a device library module 406 as shown in FIG. 4.

At block 712, the resource is accessed by the commodity OS 108. The commodity OS 108 in turn provides access to the browser kernel 112 which provides access to the principal 106 that issued the initial system call at block 702.

Illustrative Computing Device

Figure 8:
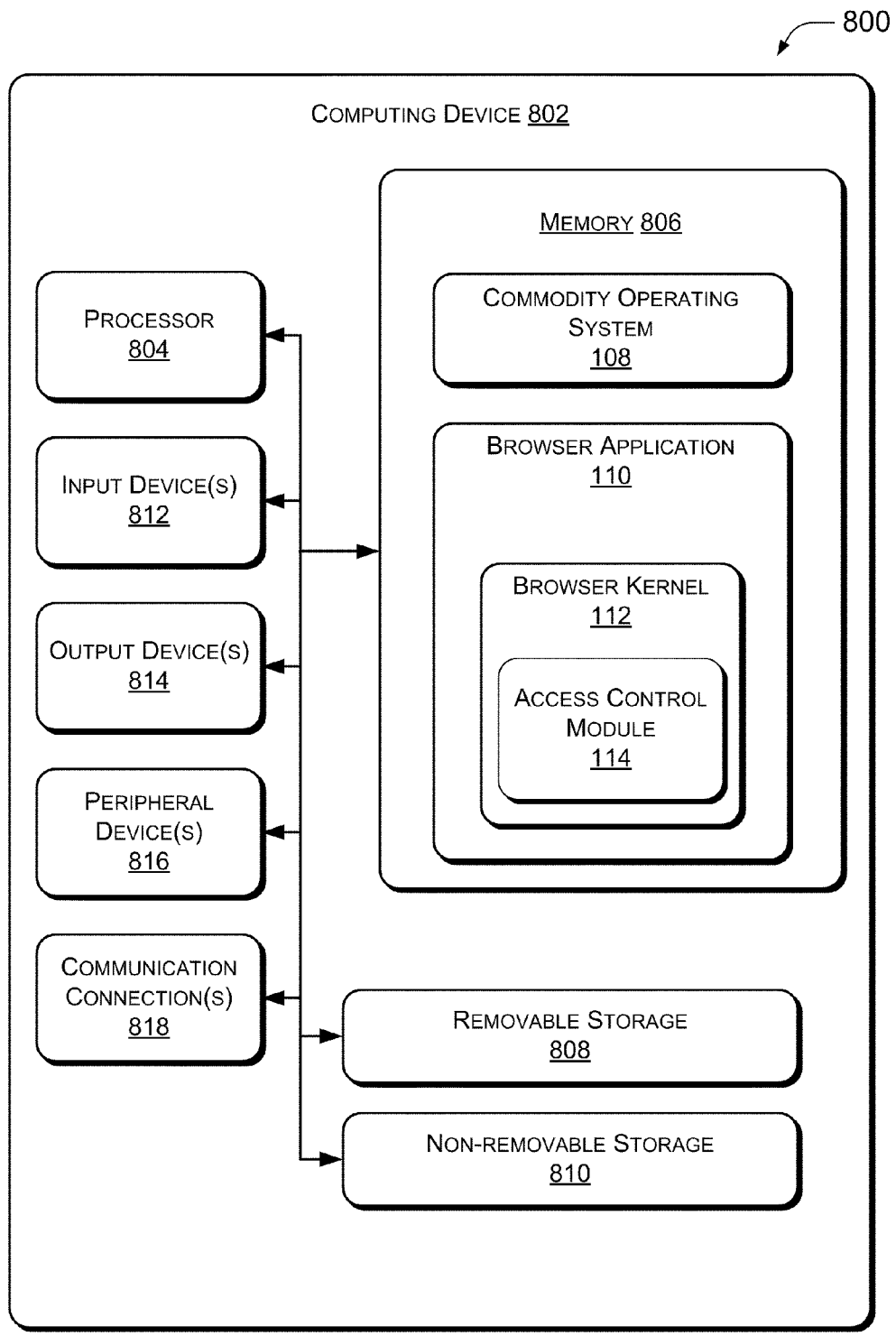
FIG. 8 is a block diagram of an illustrative computing device.

FIG. 8 is a block diagram 800 showing an illustrative computing device 802 for controlling access to a resource. The computing device 802 may be configured as any suitable system capable of controlling access to a resource 106. In one illustrative configuration, the computing device 802 comprises at least one processor 804 and memory 806. The processor 804 may be implemented as appropriate in hardware, software, firmware, or combinations thereof. Software or firmware implementations of the processor 804 may include computer- or machine-executable instructions written in any suitable programming language to perform the various functions described.

For example, the computing device 802 illustrates architecture of these components residing on one system. Alternatively, these components may reside in multiple other locations, servers, or systems. For instance, all of the components may exist on a server side accessed remotely by a user through a remote terminal. Furthermore, two or more of the illustrated components may combine to form a single component at a single location. The illustrated components may also reside in a computing device without a connection to a network, such as a stand-alone database of HTML or XML documents. The computing device 802 may in various implementations be similar to the computing device 104 shown in FIG. 1.

Memory 806 may store programs of instructions that are loadable and executable on the processor of 804, as well as data generated during the execution of these programs. Depending on the configuration and type of computing device 802, memory 806 may be volatile (such as RAM) and/or non-volatile (such as ROM, flash memory, etc.). The computing device 802 may also include additional removable storage 808 and/or non-removable storage 810 including, but not limited to, magnetic storage, optical disks, and/or tape storage. The disk drives and their associated computer-readable media may provide non-volatile storage of computer readable instructions, data structures, program modules, and other data.

Computer-readable storage media includes volatile and nonvolatile, removable and non-removable media implemented in any method or technology for storage of information such as computer readable instructions, data structures, program modules or other data. Memory 806, removable storage 808, and non-removable storage 810 are all examples of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the computing device 802.

Turning to the contents of the memory 806 in more detail, the memory 806 may include a commodity OS 108 and a browser application 110. As discussed above, the browser application 110 may include a browser kernel 112. The browser kernel may in turn include an access control module 114.

The computing device 802 may also include input device(s) 812 such as a keyboard, mouse, pen, voice input device, touch input device, stylus, and the like, and output device(s) 814 such as a display, monitor, speakers, printer, etc. The computing device 802 may also include peripheral device(s) 816 that are themselves input device(s) 812 or output device(s) 814. The peripheral device(s) 816 may include a camera, a global positioning system device, a telecom network interface device, a microphone, a speaker, or a dialer. All these devices are well known in the art and need not be discussed at length.

The computing device 802 may also contain a communication connection(s) 818 that allows the device to communicate with other devices such as servers and/or user terminals. Communication connection(s) 818 is an example of a mechanism for receiving and sending communication media. Communication media typically embodies computer readable instructions, data structures, and program modules. By way of example, and not limitation, communication media includes wired media such as a wired network or direct-wired connection, and wireless media such as acoustic, RF, infrared and other wireless media.

The subject matter described above can be implemented in hardware, software, or in both hardware and software. Although implementations of resource access with a multi-principal browser have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations of controlling access to resources. For example, the methodological acts need not be performed in the order or combinations described herein, and may be performed in any combination of one or more acts.

The invention claimed is:

1. A method implemented on a computing device by a processor configured to execute instructions that, when executed by the processor, direct the computing device to perform acts comprising:
receiving a system call from a web entity for access to a peripheral device with a capability;
comparing, by the processor, the received system call to a semantic model of peripheral device capabilities to determine whether the capability is available in the semantic model, wherein the semantic model is a hierarchical model of resource capabilities with related resource capabilities grouped together;
verifying, by a browser kernel running in a multi-principal operating system-based browser, that the web entity has authorization to access the peripheral device with the capability specified by the system call;
correlating the semantic model specified by the system call with a physical device and a device driver for the physical device; and
accessing the physical device by the device driver operating on a commodity operating system.

2. The method of claim 1, wherein the peripheral devices comprises at least one of a camera, a global positioning system device, a telecom network interface device, a microphone, a speaker, or a dialer.

3. The method of claim 1, wherein the peripheral device access system call comprises a JavaScript call.

4. The method of claim 1, further comprising providing the peripheral device capability to the web entity via the multi-principal operating system-based browser.

5. The method of claim 1, further comprising mediating communication between a browser plugin and the commodity operating system by the browser kernel.

6. A system comprising:
a processor;
a resource coupled to the processor, wherein the resource comprises a device; and
a memory coupled to the processor, the memory comprising:
a multi-principal browser having a browser kernel comprising:
an access control module configured to decide whether a system call from a web entity requesting access to the resource is permitted based at least in part on:
a resource access control policy; and
a resource object model providing semantic representations of resources, the model grouping related resources together;
a system call implementation module configured to implement the system call when the access control module decides the system call is permitted and block the system call when the access control module decides the system call is prohibited;
a device library module comprising an application programming interface for communicating with a commodity operating system; and
the commodity operating system configured to provide the web entity access to the resource based on the system call.

7. The system of claim 6, wherein the resource comprises a peripheral device.

8. The system of claim 6, wherein the access control module decides whether the system call from the web entity is permitted based at least in part on an attribute.

9. The system of claim 8, wherein the attribute comprises at least one of a user ask attribute, a background attribute, a lifetime attribute, a concurrent use attribute, or a charge money attribute.

10. The system of claim 6, wherein the access control module decides whether the system call from the web entity is permitted based at least in part on user input.

11. The system of claim 10, wherein the user input is insufficient to permit the system call from the web entity to access a subset of the resources that are protected resources.

12. One or more computer-readable storage devices having computer-readable instructions thereon which, when executed by a processor, cause a computing device comprising a multi-principal browser to perform acts comprising:

modeling resources in a hierarchical resource object model tree, wherein the resources comprise at least one hardware device, comprising:
   leaf nodes providing semantic representations of resource capabilities that are independent of corresponding physical resources;
   intermediate nodes grouping the resource capabilities that are related together; and
   a root node grouping the resources available to the computer system; and
in response to receiving a call from a principal, granting a resource capability represented by a granted node to the principal in accordance with a resource access control policy.

13. The computer-readable storage devices of claim 12, wherein the principal comprises a web entity and a resource comprises a peripheral device.

14. The computer-readable storage devices of claim 12, further comprising sending a request to a commodity operating system to access a resource having a capability represented by the granted node.

15. The computer-readable storage devices of claim 12, wherein the granting is based at least in part on an attribute assigned to the node, the attribute comprising one of a user ask attribute, a background attribute, a lifetime attribute, a concurrent use attribute, or a charge money attribute.

16. The computer-readable storage devices of claim 12, wherein the nodes in the hierarchical resource object model tree are implemented as a triple of node ID, unforgeable-token, and attributes.

17. The method claim 1, wherein the semantic model is separate from details of the physical peripheral devices.

18. The system of claim 6, wherein the resource object model is separate from details of the specific resources.

19. The computer-readable storage devices of claim 12, wherein the granted node comprises an intermediate node or a root node and wherein granting the resource capability represented by the granted node comprises granting resource capabilities of other nodes in a subtree rooted by the granted node.

20. The computer-readable devices of claim 12, wherein the resource object model tree is separate from details of the specific resources.

* * * * *